(12) United States Patent
Tullberg et al.

(10) Patent No.: US 12,544,518 B2
(45) Date of Patent: Feb. 10, 2026

(54) THAWING DEVICE AND METHOD THEREOF

(71) Applicant: Conroy Medical AB, Upplands Väsby (SE)

(72) Inventors: Mattias Tullberg, Uppsala (SE); Joachim Sällvin, Saltsjö-Boo (SE); Andreas Svensson, Vendelsö (SE); Sven Sundin, Norrtälje (SE)

(73) Assignee: Conroy Medical AB, Upplands Väsby (SE)

( * ) Notice: Subject to any disclaimer, the term of this patent is extended or adjusted under 35 U.S.C. 154(b) by 847 days.

(21) Appl. No.: 17/794,287

(22) PCT Filed: Jan. 20, 2021

(86) PCT No.: PCT/SE2021/050030
§ 371 (c)(1),
(2) Date: Jul. 21, 2022

(87) PCT Pub. No.: WO2021/150159
PCT Pub. Date: Jul. 29, 2021

(65) Prior Publication Data
US 2023/0078384 A1 Mar. 16, 2023

(30) Foreign Application Priority Data
Jan. 21, 2020 (SE) .................... 2050046-8

(51) Int. Cl.
*H05B 6/50* (2006.01)
*A61M 5/44* (2006.01)
*H05B 6/62* (2006.01)

(52) U.S. Cl.
CPC ............... *A61M 5/445* (2013.01); *H05B 6/50* (2013.01); *H05B 6/62* (2013.01)

(58) Field of Classification Search
CPC .................................. H06B 6/62; A61M 5/445
See application file for complete search history.

(56) References Cited

U.S. PATENT DOCUMENTS

| | | | | |
|---|---|---|---|---|
| 3,518,393 A | * | 6/1970 | Barclay ................. | A61M 5/445 219/777 |
| 5,616,268 A | * | 4/1997 | Carr ....................... | A61M 5/445 219/709 |

(Continued)

FOREIGN PATENT DOCUMENTS

| | | |
|---|---|---|
| CN | 1545823 A | 11/2004 |
| CN | 103765985 A | 4/2014 |

(Continued)

OTHER PUBLICATIONS

Written Opinion and International Search Report corresponding with Application No. PCT/SE2021/050030 mailed Apr. 6, 2021.

(Continued)

*Primary Examiner* — Woody A Lee, Jr.
(74) *Attorney, Agent, or Firm* — Renner, Otto, Boisselle & Sklar, LLP

(57) ABSTRACT

A method for a thawing device configured to thaw/heat a blood product comprised in a container, the method comprising the steps of performing a massaging motion, by a first actuator, on one or more areas of an outer surface of the container, obtaining measurements, from a reflectance sensor coupled to an antenna, the measurements at least being indicative of phase of received radio frequency, RF, waves having a second frequency and being reflected off the container, determining a third frequency, wherein the third frequency is determined by a predetermined relation dependent on the second frequency and the obtained measurements, controlling a transmitter, communicatively coupled to the antenna, to emit RF waves, using the obtained measurements, wherein the emitted RF waves are emitted at (Continued)

a third frequency and are directed by the antenna to propagate towards the container, wherein the third frequency is in the range of 10 to 900 MHz.

15 Claims, 6 Drawing Sheets

(56) References Cited

U.S. PATENT DOCUMENTS

| | | |
|---|---|---|
| 6,657,173 B2 | 12/2003 | Flugstad et al. |
| 2013/0056461 A1 | 3/2013 | Ekemar et al. |
| 2014/0287100 A1 | 9/2014 | Libman |
| 2016/0249416 A1 | 8/2016 | Elboim et al. |
| 2019/0336706 A1 | 11/2019 | Shavit et al. |

FOREIGN PATENT DOCUMENTS

| | | | |
|---|---|---|---|
| DE | 19726625 A1 * | 12/1998 | ........... H05B 6/6408 |
| EP | 3155873 B1 * | 9/2019 | ............... H05B 6/80 |
| WO | 2011145994 A1 | 11/2011 | |
| WO | 2013159815 A1 | 10/2013 | |
| WO | 2015052145 A1 | 4/2015 | |
| WO | 2017123145 A1 | 7/2017 | |

OTHER PUBLICATIONS

Indian Office Action for corresponding Application No. 202227044484, issued Apr. 27, 2023.

* cited by examiner

THAWING DEVICE AND METHOD THEREOF

This application is a national phase of International Application No. PCT/SE2021/050030 filed Jan. 20, 2021, which claims priority to Swedish Application No. 2050046-8 filed Jan. 21, 2020, each of which is hereby incorporated herein by reference in its entirety.

TECHNICAL FIELD

The present invention relates to a thawing/heating device configured to thaw/heat a blood product comprised in a container. The method further relates to a method thereof.

BACKGROUND

There are many situations in which a substance, such as a blood product, is to be heated and/or thawed from a first temperature (e.g., from a solid state below zero degrees Celsius) to a second temperature (e.g., to liquid state in room temperature). Heating blood products, such as frozen blood plasma, to a temperature suitable for introduction into the human body is one example of such thawing/heating. In examples where a blood product is thawed/heated in preparation for surgery, it is also important that this thawing/heating is effected quickly.

WO 2011/145994 discloses a solution for a warming process wherein a dielectric load is heated via an electromagnetic field. Here, the blood product or load is surrounded by a field equalizing material.

A further challenge, not addressed by conventional systems, is to ensure that a greater part of emitted Radio Frequency, RF, energy contribute to thawing/heating the substance and is not reflected back to the emitting antenna. This is particularly true when a container holding the blood product is subjected to a massaging motion, thus the dielectric load formed by the container/blood product is changed when subjected to the massaging motion. This will change the reflectance or ratio of RF energy transmitted to the container and reflected back from the container to the transmitting antenna. Thus, minimal reflection or resonance of the system is not achieved.

Thus, there is a need for an improved thawing device for blood products and a method thereof.

OBJECTS OF THE INVENTION

An objective of embodiments of the present invention is to provide a solution which mitigates or solves the drawbacks and problems described above.

SUMMARY OF THE INVENTION

The above and further objectives are achieved by the subject matter described herein. Further advantageous implementation forms of the invention are further defined herein.

According to a first aspect of the invention, the above mentioned and other objectives are achieved by a method for a thawing device configured to thaw/heat a blood product comprised in a container. The method comprising the steps of performing a massaging motion, by a first actuator, on one or more areas of an outer surface of the container, obtaining measurements, from a reflectance sensor coupled to an antenna, the measurements being at least indicative of phase of received radio frequency, RF, waves having a second frequency and being reflected off the container, determining a third frequency, wherein the third frequency is determined by a predetermined relation dependent on the second frequency and the obtained measurements, controlling a transmitter, communicatively coupled to the antenna, to emit RF waves, using the obtained measurements, wherein the emitted RF waves are emitted at a third frequency and are directed by the antenna to propagate towards the container, wherein the third frequency is in the range of 10 to 900 MHz According to a second aspect of the invention, the above mentioned and other objectives are achieved by thawing device configured to thaw/heat a blood product comprised in a container, the thawing device comprising a first controllable actuator configured to performing a massaging motion on one or more areas of an outer surface of the container, a controllable transmitter configured to generate RF waves and being communicatively coupled to an antenna configured to emit RF waves towards the container, a reflectance sensor coupled to the antenna and configured to measure characteristics of radio frequency, RF, waves, the measurements at least being indicative of amplitude and phase of received radio frequency, RF, waves having a second frequency and being reflected off the container, a control unit communicatively coupled to the first actuator, the transmitter, the control unit comprising processing circuitry; and a memory, said memory containing instructions executable by said processing circuitry, whereby said thawing device is operative/configured to perform any of the method steps according to the first aspect.

The advantages of the first and second aspect is at least that a time required for thawing/heating a blood product can be reduced, in particular in situations in which a substance, such as a blood product, is to be heated or thawed from a first temperature (e.g., from a solid state below zero degrees Celsius) to a second temperature (e.g., to liquid state in room temperature).

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

Figure 1:
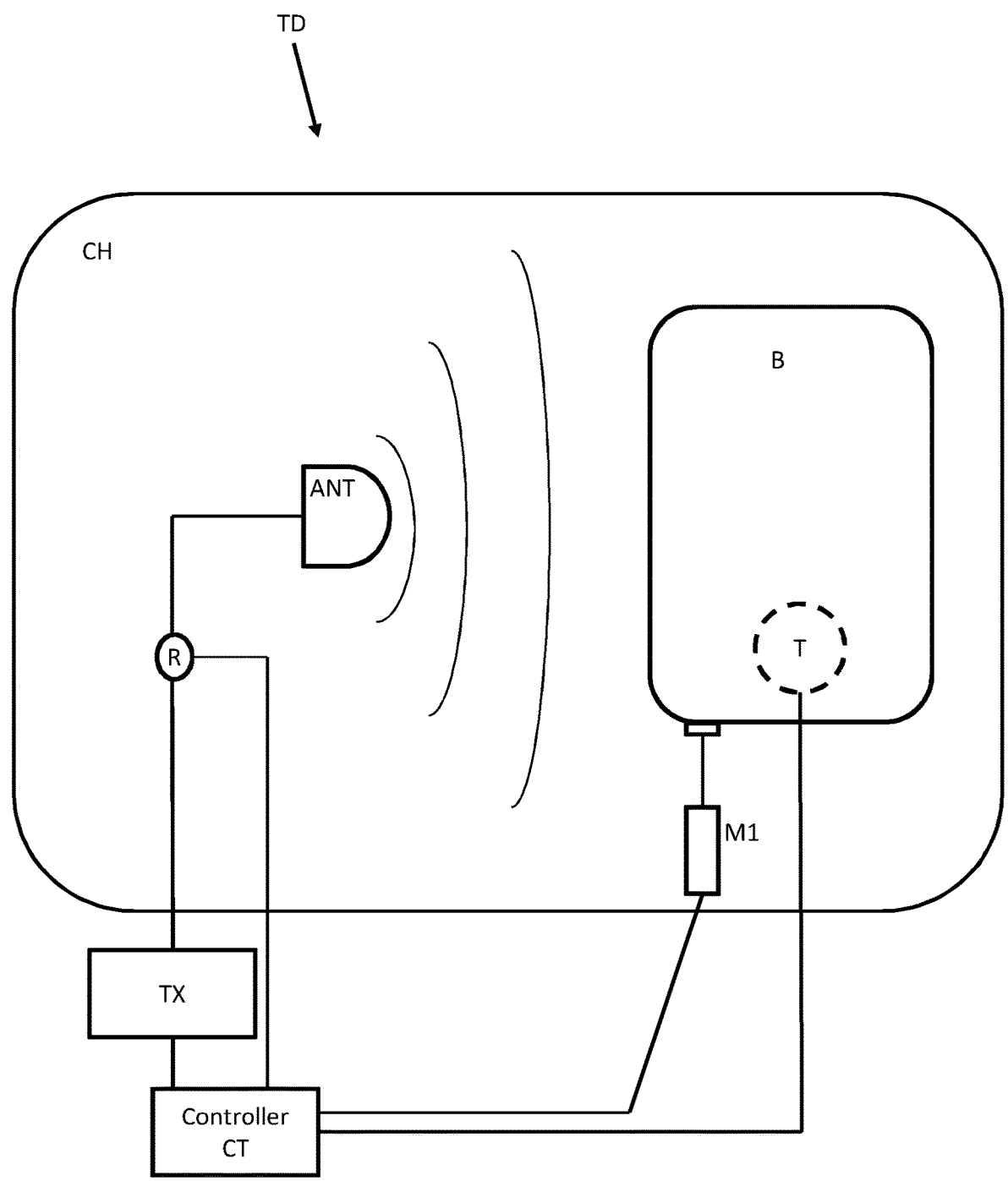
FIG. 1 illustrates a thawing device according to one or more embodiments of the present disclosure.

A more complete understanding of embodiments of the invention will be afforded to those skilled in the art, as well as a realization of additional advantages thereof, by a consideration of the following detailed description of one or

DETAILED DESCRIPTION

The present disclosure relates to thawing/heating blood products, typically frozen blood plasma but could also be used for bone marrow and stem cell products. As large amounts of plasma may be required when performing an operation, it is important that the time spent bringing the blood product to room temperature is as short as possible. As mentioned in the background section, the thawing/heating of the blood product must be effected quickly and preferably with very high precision, i.e., uniformly and without overheating any parts of the substance. Otherwise, the blood product may not be available in time for surgery or may be rendered useless and must be disposed.

The present disclosure achieves this by dynamically controlling radio frequency, RF, transmission, whilst simultaneously performing mechanical processing or a massaging motion. The mechanical processing/massaging motion of a container comprising the blood product significantly reduces the time needed by softening frozen parts of the blood product. This has the drawback that the reflectance of the container typically changes constantly and rapidly, thereby reducing the ratio of the energy absorbed by the blood product to the energy reflected back to the antenna. This is due to the fact that the dielectric load formed by the blood product changes when subjected to massage.

The present disclosure solves this problem by providing a fast control loop of the transmitted RF energy in relation to the repetition frequency of the mechanical processing/massaging motion. Typically, the frequency of the emitted RF signal is adapted a 1000 times for each massaging motion of the container, but factors of 800 times, 500 times, 300 times, 200 times, 100 times, 50 times, 25 times, 10 times, 5 times or even two times may be used as well depending on the application.

This has at least the advantage that the time required to thaw/heat the blood product is reduced, thereby making the preparation process of frozen blood products more efficient.

An "or" in this description and the corresponding claims is to be understood as a mathematical OR which covers "and" and "or", and is not to be understood as an XOR (exclusive OR). The indefinite article "a" in this disclosure and claims is not limited to "one" and can also be understood as "one or more", i.e., plural.

In the present disclosure, the term "blood product" denotes any therapeutic substance prepared from human blood. This includes e.g., whole blood; blood components; and plasma derivatives. Blood components may include: red blood cell concentrates or suspensions; platelets produced from whole blood or via apheresis; plasma; and cryoprecipitate. Plasma derivatives may be plasma proteins prepared under pharmaceutical manufacturing conditions and includes e.g., albumin; coagulation factor concentrates; and immunoglobulins.

In the present disclosure, the term "container" denotes a receptacle or means for holding a blood product, typically an elastic bag or bladder.

FIG. 1 illustrates a thawing device TD according to one or more embodiments of the present disclosure. The thawing device is configured to thaw/heat a blood product comprised in a container B, typically an elastic bag or bladder.

The thawing device TD comprises at least a first controllable actuator M1 configured to performing a massaging motion on one or more areas of an outer surface of the container B. The actuator may typically be a pneumatic actuator controlled by a control signal sent from a controller CT. This massaging motion is particularly important when at least parts of the blood product is in a frozen state and may contribute to breaking up solid parts of the blood product to smaller parts. Furthermore, the massage will ensure more even temperature distribution in the thawed/heated blood product. The first actuator M1 may be controlled to perform the massaging motion by exerting a first force to an outer surface of the container B, e.g., according to a first periodic function repeated at a first frequency f1. Periodic functions are further described in relation to FIG. 6. The actuator/s may be configured to exerting the force directly to the container B or via intermediate members, further described in relation to FIG. 3.

The thawing device further comprises a controllable transmitter TX configured to generate RF waves and being communicatively coupled to an antenna ANT. The controllable transmitter TX is typically controlled by a control unit sending a control signal to the controllable transmitter TX. In other words, the characteristics of the transmitter TX may be controlled based on a received control signal, e.g., controlling amplitude, phase or frequency of transmitted RF waves based on a received control signal.

The transmitter TX may typically be controlled to use a particular amplitude of the RF waves and/or a particular phase of the RF waves and/or a particular frequency of the RF waves. The antenna is configured to emit RF waves towards the container B.

The thawing device further comprises a reflectance sensor or sensor R coupled to the antenna ANT and configured to measure characteristics of received radio frequency, RF, waves. The reflectance sensor R is configured to measure characteristics of the RF waves, typically measuring both transmitted and received RF waves.

In one example, the reflectance sensor R comprises directional couplers configured to divert parts of transmitted and received RF waves to respective measurement ports. The reflectance sensor R further comprises measurement circuitry capable of measuring and quantifying the diverted parts of transmitted and received RF waves to measured amplitude and/or phase values. In this way differences in phase between transmitted and received RF Waves and/or quotas of amplitudes of transmitted and received RF waves can be calculated by the controller CT.

The received RF waves are typically reflected from the container B and transmitted as well as received by the antenna ANT. The measurements may at least be indicative of amplitude A and/or phase cp of received RF waves having a second frequency f2 and are typically being reflected off the container B. Thus, the measurements can be seen as being indicative of relative relations between emitted RF energy and RF energy reflected back to the antenna. In other words, a ratio between an amplitude of an emitted RF signal and a received/reflected RF signal as well as a relative phase difference between the emitted RF signal and the received/reflected RF signal may be calculated. This is possible as the characteristics of the emitted RF waves are known, e.g., by the control unit CT.

The thawing device further comprises the control unit CT communicatively coupled to the first actuator M1, to the reflectance sensor R and to the transmitter TX. The control unit CT comprises processing circuitry; and a memory, the memory containing instructions executable by said processing circuitry, whereby said thawing device is operative/configured to perform any of the method steps described herein.

Optionally, the thawing device may further comprise a temperature sensor T. The temperature sensor T may be configured to detect high temperatures, and send control signals to the CT. The CT can then act upon this information by controlling the transmitter TX to reduce power output.

Figure 2:
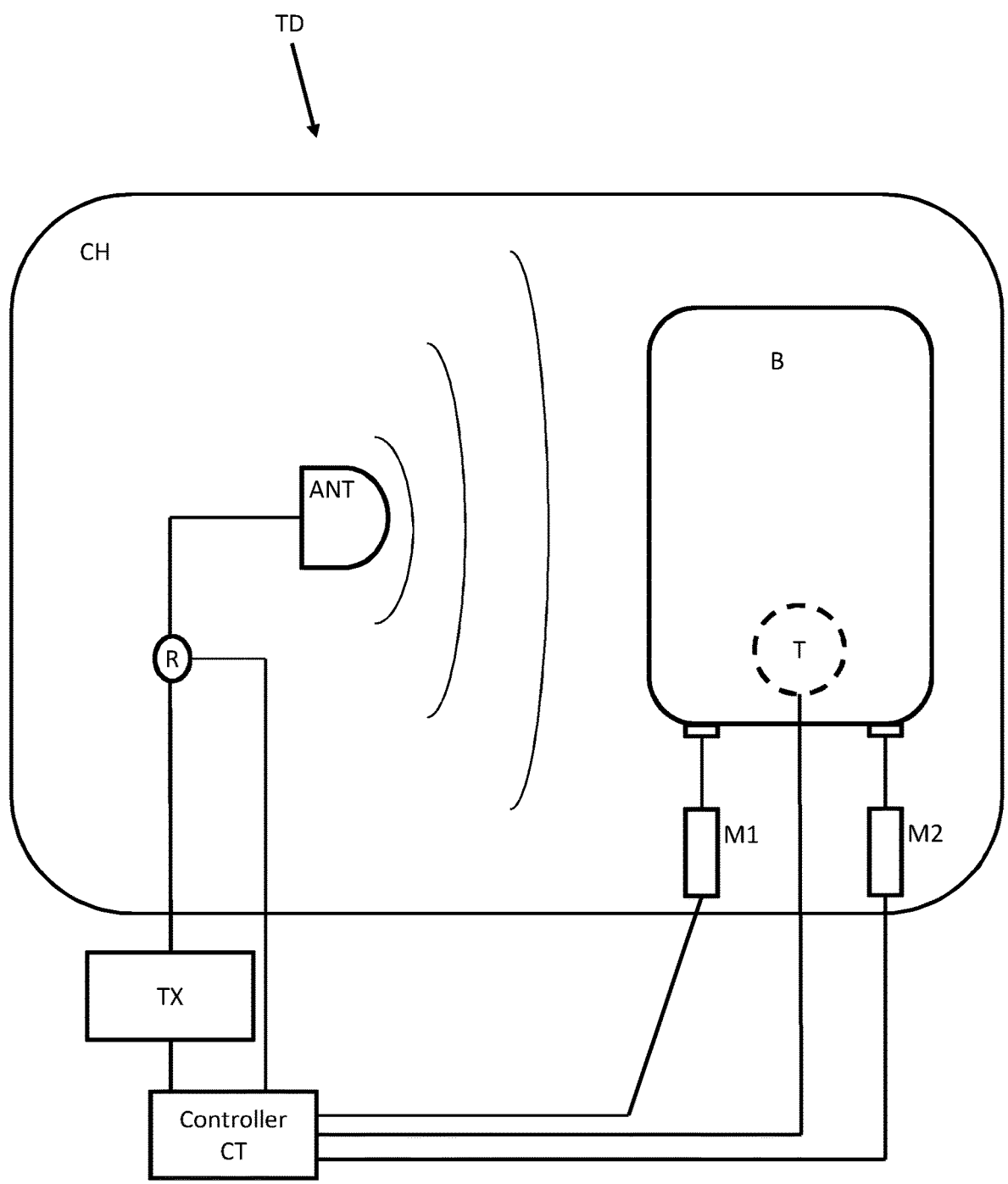
FIG. 2 illustrates a thawing device having multiple actuators according to one or more embodiments of the present disclosure.

FIG. 2 illustrates a thawing device TD having multiple actuators according to one or more embodiments of the present disclosure. The thawing device is configured to thaw/heat a blood product comprised in a container B. The thawing device is identical to the one described in relation to FIG. 1, but further comprises a second controllable actuator M2 configured to performing a massaging motion on one or more areas of an outer surface of the container B. The second actuator M2 may be controlled to perform the massaging motion by exerting a second force to the container B, e.g., according to a second periodic function PF2 repeated at the first frequency f1. The second periodic function may be defined as a phase-shifted version of the first periodic function and is further described in relation to the example shown in FIG. 6.

The control unit CT may further be further configured to controlling the second actuator M2 to massage the container B.

In one non-limiting example, the first actuator is exerting the first force to the container B according to the first periodic function PF1, being a sinusoidal function. The second actuator M2 is simultaneously exerting a second force to the container B according to the second periodic function PF2, being a sinusoidal function having a phase offset of 180 degrees compared to the first periodic function PF1.

Optionally, the thawing device may further comprise a temperature sensor T. The temperature sensor T may be configured to detect high temperatures, and send control signals to the CT. The CT can then act upon this information by controlling the transmitter TX to reduce power output.

It is understood that the concept can be extended to three or more actuators, each having an associated function with different phase shifts relative to the first periodic function, without deviating from the disclosure herein.

In one example, a number M of actuators can be used, each associated to a periodic function phase shifted relative to the first periodic function by a multiple of 360/M degrees.

In some embodiments, further features are provided to facilitate a secure holding of the container relative to the antenna as well as protecting the inside of the thawing device from blood product leakage.

Figure 3:
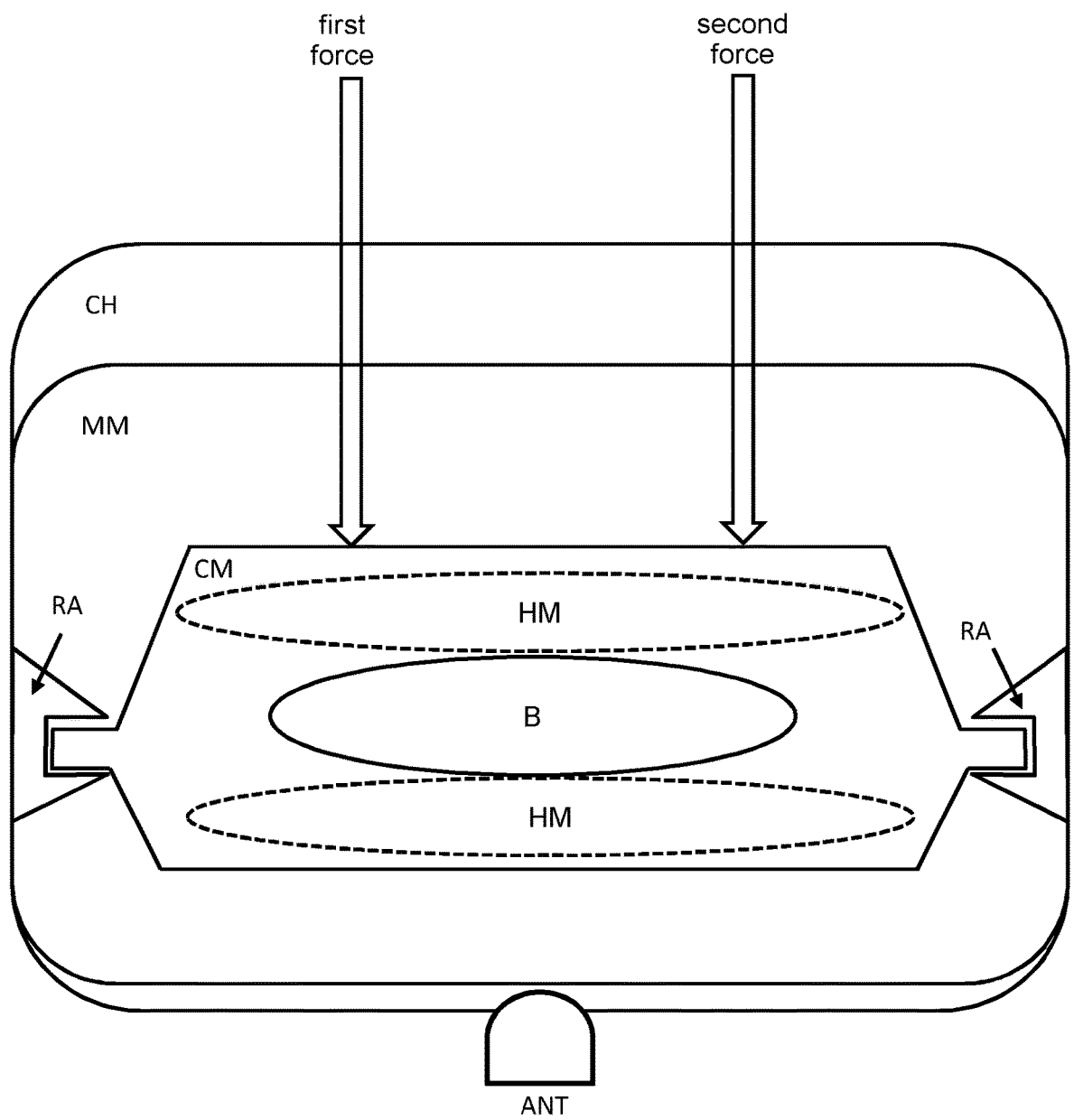
FIG. 3 illustrates a section view of a thawing device having a chamber, a mounting member, and a cassette member according to one or more embodiments of the present disclosure.

FIG. 3 illustrates a section view of a thawing device TD having a chamber CH, a mounting member MM and a cassette member CM according to one or more embodiments of the present disclosure. In one embodiment, the thawing device further comprises a chamber CH configured to hold the container B during thawing/heating thereof. The chamber CH also prevents any RF radiation from escaping from the thawing device and is typically made from metal or any other conducting material capable of dampening or attenuating the RF radiation.

Additionally or alternatively, the thawing device further comprises a mounting member or bucket MM configured to be releasably attached to the chamber CH. The mounting member MM may also act as a protection device if the container is somehow damaged, and the blood product leaks out into the chamber. The mounting member MM may be attached to the chamber CH using attachment means, such as screws. The mounting member MM may e.g., made from plastic. The mounting member MM may optionally be attached to the chamber CH using friction, where the shape of the mounting member MM conforms with the shape of the chamber CH.

Additionally or alternatively, the thawing device further comprises a cassette member CM configured to hold the container B. The mounting member MM may be provided with receiving arrangements RA configured to securably/securely and supportably receiving the cassette member CM in a fixed position relative to the mounting member and relative to the antenna ANT. The cassette member CM may further be provided with holding members HM, e.g., elastic bladders, arranged to be in contact with the container B and cassette member CM. The holding members HM may be filled with a fluid, such as clean and de-ionized water.

This has the advantage of both holding the container B in a fixed position and/or help in preventing hot-spots, i.e. overheating of local areas of the blood product.

Figure 4:
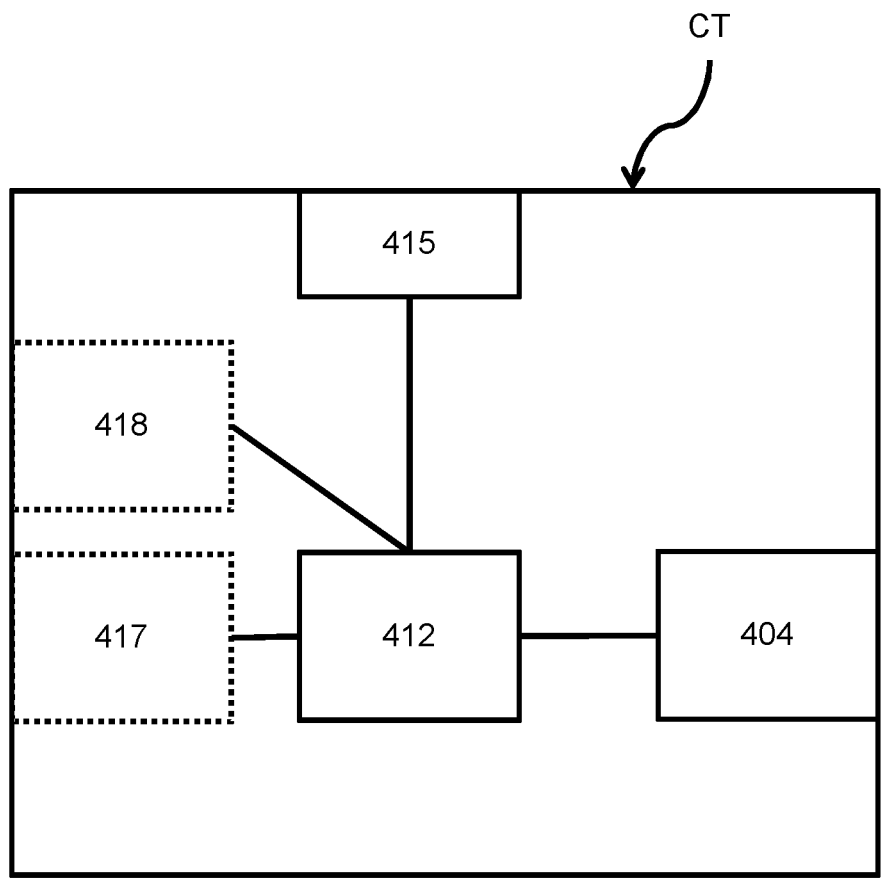
FIG. 4 shows a control unit according to one or more embodiments of the present disclosure.

FIG. 4 shows the control unit CT according to one or more embodiments of the present disclosure. The control unit CT may be in the form of e.g., an Electronic Control Unit, a server, an on-board computer, a stationary computing device, a laptop computer, a tablet computer, a handheld computer, a wrist-worn computer, a smart watch, a smartphone, or a smart TV. The control unit CT may comprise processing circuitry 412 communicatively coupled to a transceiver 404 configured for wired or wireless communication. The control unit CT may further comprise at least one optional antenna (not shown in figure). The antenna may be coupled to the transceiver 404 and is configured to transmit and/or emit and/or receive wired or wireless signals in a communication network, such as Wi-Fi, Bluetooth, 3G, 4G, 5G etc. In one example, the processing circuitry 412 may be any of a selection of processing circuitry and/or a central processing unit and/or processor modules and/or multiple processors configured to cooperate with each-other. Further, the control unit CT may further comprise a memory 415. The memory 415 may e.g., comprise a selection of a hard RAM, disk drive, a floppy disk drive, a flash drive or other removable or fixed media drive or any other suitable memory known in the art. The memory 415 may contain instructions executable by the processing circuitry to perform any of the steps or methods described herein. The processing circuitry 412 may optionally be communicatively coupled to a selection of any of the transceiver 404, the memory 415, one or more sensors T, such as the temperature sensor. The control unit CT may be configured to send/receive control signals directly to any of the above-mentioned units or to external nodes or to send/receive control signals via the wired and/or wireless communications network.

The wired/wireless transceiver 404 and/or a wired/wireless communications network adapter may be configured to send and/or receive data values or parameters as a signal to or from the processing circuitry 412 to or from other external nodes. E.g., measured characteristics of the received RF waves.

In an embodiment, the transceiver 404 communicates directly to external nodes or via the wireless communications network.

In one or more embodiments the control unit 410 may further comprise an input device 417, configured to receive input or indications from a user and send a user input signal indicative of the user input or indications to the processing circuitry 412.

In one or more embodiments the control unit CT may further comprise a display 418 configured to receive a display signal indicative of rendered objects, such as text or graphical user input objects, from the processing circuitry 412 and to display the received signal as objects, such as text or graphical user input objects.

In one embodiment the display 418 is integrated with the user input device 417 and is configured to receive a display signal indicative of rendered objects, such as text or graphical user input objects, from the processing circuitry 412 and to display the received signal as objects, such as text or graphical user input objects, and/or configured to receive input or indications from a user and send a user-input signal indicative of the user input or indications to the processing circuitry 412.

In a further embodiment, the control unit CT may further comprise and/or be coupled to one or more additional sensors (not shown in the figure) configured to receive and/or obtain and/or measure physical properties pertaining to the thawing device and send one or more sensor signals indicative of the physical properties o to the processing circuitry 412. E.g., a temperature sensor measuring temperature of the blood product.

In one or more embodiments, the processing circuitry 412 is further communicatively coupled to the input device 417 and/or the display 418 and/or the additional sensors.

Figure 5:
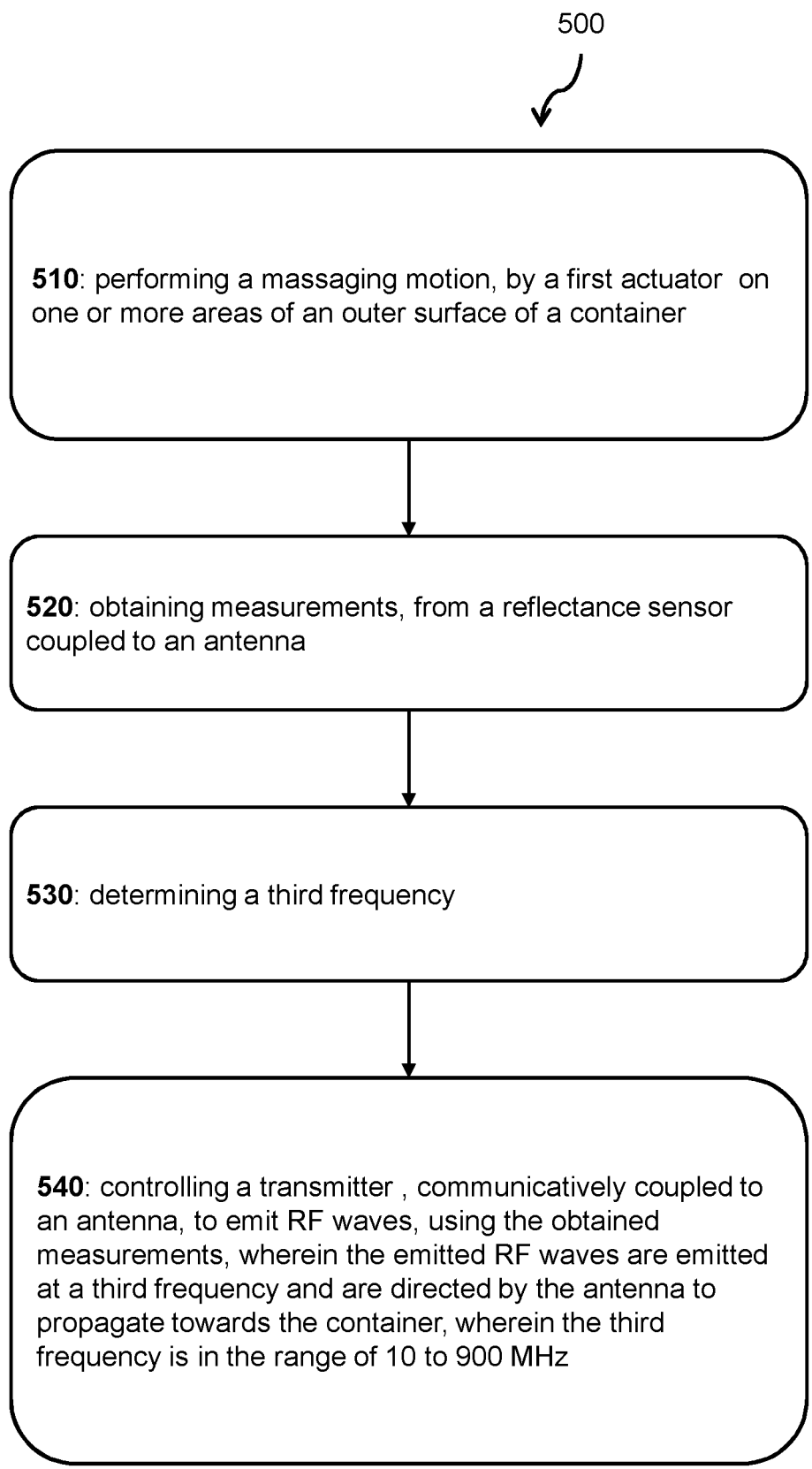
FIG. 5 shows a flowchart of a computer implemented method according to one or more embodiments of the present disclosure.

FIG. 5 shows a flowchart of a computer implemented method according to one or more embodiments of the present disclosure. The method is performed by a thawing device TD configured to thaw/heat a blood product comprised in a container B. The method comprises the steps of:

Step 510: Performing a massaging motion, by a first actuator M1, on one or more areas of an outer surface of the container B. The first actuator M1 may e.g., be controlled by the control unit CT to perform the massaging motion according to a function exerting a particular force.

Optionally or additionally the massaging motion may exert a force to the container B, e.g., according to a periodic or random function.

Optionally or additionally, the massaging motion may exert a force to the container B. The force may e.g., be exerted according to a first periodic function PF1 repeated at a first frequency f1. Typically, this may involve cyclically increasing the exerted force from zero to a predetermined value and then reducing the force back to zero again.

Step 520: Obtaining measurements, from a reflectance sensor R coupled to an antenna ANT, the measurements being at least indicative of a phase φ of received radio frequency, RF, waves having a second frequency f2 and being reflected off the container B.

Optionally or additionally, the measurements may further include a selection of amplitude A of received radio frequency, RF, waves, amplitude A_tx of transmitted radio frequency, RF, waves, and phase φ_tx of transmitted radio frequency, RF, waves.

Optionally or additionally, relative measures of transmitted and received amplitude and phase may be calculated, e.g., a difference in phase (φ−φ_tx) and/or a quota of amplitudes (A/A_tx).

It is understood that the transmitted RF waves and the received RF waves have the same frequency f2. Thus, the second frequency f2 can be seen as the currently used RF transmission frequency.

Step 530: Determining a third frequency f3. The third frequency f3 is the frequency that will be used for the upcoming transmission of the RF waves. Thus, the third frequency f3 can be seen as a set-point frequency or the target frequency to be used to reduce reflectance or reflected energy mainly due to the massaging motion. Yet another way to describe the third frequency f3 is as an estimated resonance frequency, where a minimum level of reflected energy received at the antenna is achieved. The third frequency f3 is determined by a predetermined relation dependent on the second frequency f2 and the obtained measurements.

In one embodiment, a hysteresis is introduced, such that the frequency is only adapted if the reflected RF energy exceeds a threshold.

Additionally or alternatively, if the measured amplitude is above a threshold, e.g., the ratio of amplitudes of received RF waves and transmitted RF waves are over −8 dB. Additionally or alternatively, the third frequency f3 is alternatively determined to the second frequency f2 if the measure amplitude is equal to or below the threshold, e.g., the ratio of amplitudes of received RF waves and transmitted RF waves are equal to or below −8 dB. The threshold may e.g., be set to 8 dB, meaning that the third frequency f3 is determined to the second frequency f2 if the difference between the transmitted and received RF signal amplitude is greater than 8 dB.

Step 540: Controlling a transmitter TX, communicatively coupled to the antenna ANT, to emit RF waves, using the obtained measurements. The emitted RF waves are emitted at a third frequency f3 and are directed by the antenna ANT to propagate towards the container B. In one embodiment, the third frequency f3 is in the range of 10 to 900 MHz.

In one embodiment, the predetermined relation is defined as:

$$f3 = f2 + k*(\varphi\_Ref - \varphi)$$

wherein f3 is the third frequency, f2 is the second frequency, k is a scale factor, φ_Ref is a reference phase value and P is the measured phase of the received RF waves.

Additionally or alternatively, the reference phase value is obtained by initially sweeping said range of 10 to 900 MHz to obtain a minimum reflection value, e.g. (A/A_tx), and measuring the reference phase φ_Ref at the frequency where the minimum reflection value is obtained. In other words, pulses of RF waves having varying frequency, e.g. changed in steps within the range, are transmitted and the ratio between transmitted and received RF signal amplitude is recorded together with a relative phase values for each frequency resulting from one or more steps. The phase value of the frequency associated with the lowest ratio is recorded, stored, and used as the reference phase value. Typically, the frequency of the emitted RF signal is adapted a 1000 times for each performed massaging motion of the container, but factors of 800 times, 500 times, 300 times, 200 times or even two times may be used as well depending on the application.

Another way to describe the relation between the massaging motion and the control loop of the transmitted RF waves is to look at the maximum change in resonance frequency when a massaging motion is performed versus the maximum change in frequency the control loop can achieve in one step.

Yet another way to describe the relation between the massaging motion and the control loop of the transmitted RF waves is that the sampling rate must be at least twice the maximum change in resonance frequency.

Additionally or alternatively, the first actuator M1 is controlled to massage the container B, using the obtained measurements.

The first actuator M1 is typically controlled to perform a massaging motion on one or more areas of an outer surface of the container B. The massaging motion exerts a force to the container B, e.g., according to the first periodic function PF1, e.g., repeated at the first frequency f1. Typically, this involves cyclically increasing the exerted force from zero to a predetermined value and then reducing the force back to zero again. In other words, the force and frequency of the massaging motion may be controlled, typically by the control unit CT.

In one embodiment the repetition frequency of the massage is adapted. Typically, this involves decreasing or increasing the first frequency, e.g., to a fourth frequency. In an example where a periodic function is used, the first periodic function may be compressed or extended in time accordingly. In a further example where a random function is used to determine the exerted force.

In one embodiment, the first actuator M1 is controlled to massaging the bag using the obtained measurements by exerting a force to the container B according to the first periodic function repeated at a fourth frequency f4, the fourth frequency f4 being dependent on the third frequency f3. In one further embodiment, the fourth frequency f4 is increased in proportion to a decrease of the third frequency f3.

In one embodiment the force of the massage is adapted. Typically, this involves decreasing or increasing the first exerted force.

In this embodiment, the first actuator M1 is controlled to massage the bag using the obtained measurements by exerting an adapted force to the container B according to the first periodic function repeated at a frequency, the adapted force being dependent on the third frequency f3. In one further embodiment, the adapted force is decreased in proportion to a decrease of the third frequency f3.

In one embodiment, a computer program is provided and comprises computer-executable instructions for causing the control unit CT when the computer-executable instructions are executed on the processing circuitry comprised in the control unit CT to perform any of the method steps described herein.

In one embodiment, a computer program product is provided and comprises a computer-readable storage medium, the computer-readable storage medium having the computer program above embodied therein.

Figure 6:
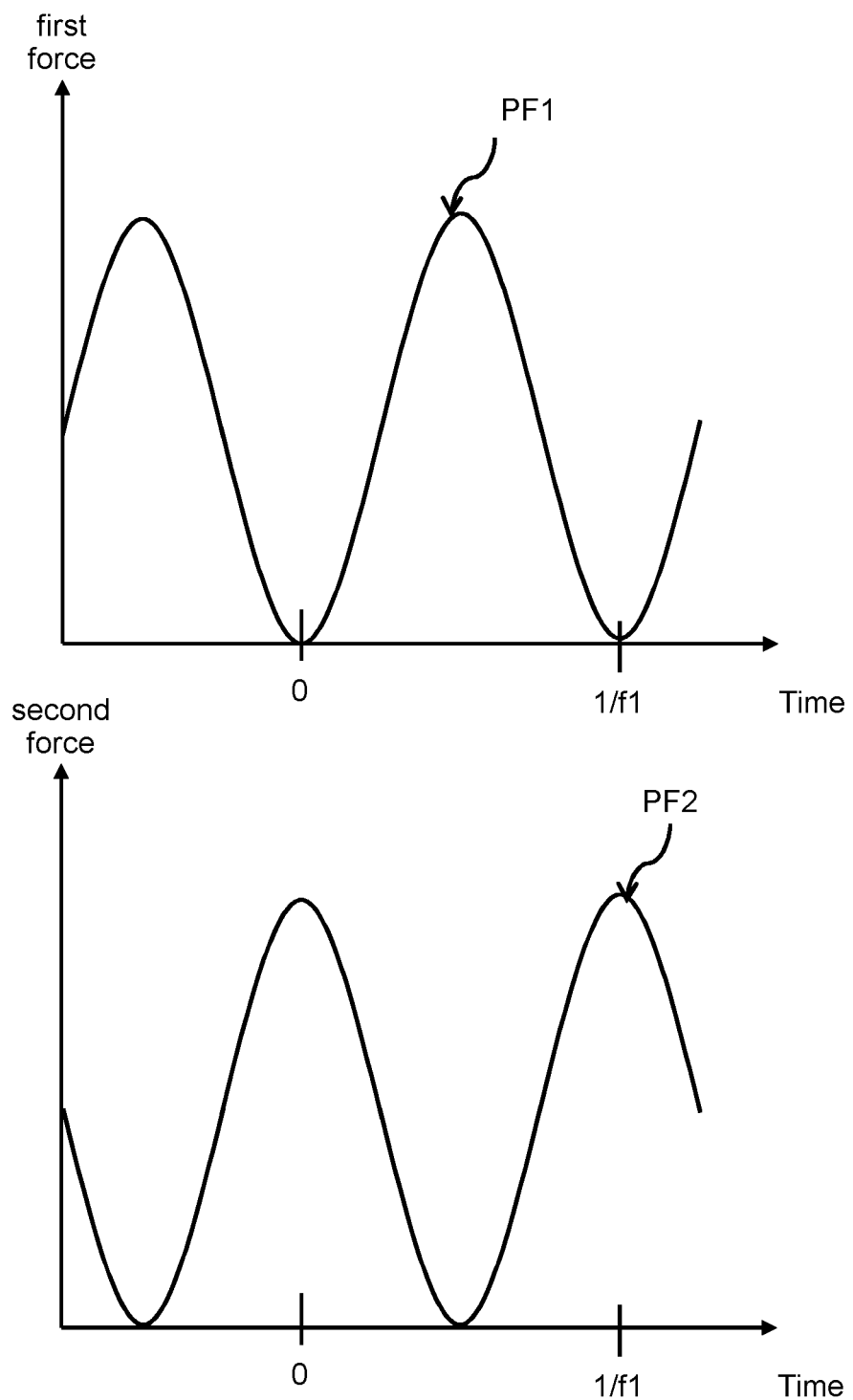
FIG. 6 illustrates an example of phase shifted periodic functions according to one or more embodiments of the present disclosure.

FIG. 6 illustrates an example of phase shifted periodic functions according to one or more embodiments of the present disclosure. In the example shown in FIG. 6, two actuators are used, each provided with a periodic function giving an exerted force given an elapsed time.

FIG. 6 shows two diagrams, each diagram showing the force to be exerted by the massaging motion on the vertical axis and elapsed time on the horizontal axis. The curves PF1, PF2 indicate the target force for each given moment in time.

As can be seen in FIG. 6, the periodic function PF1 completes a cycle from time 0 to time 1/f1 and provides the force to be exerted by the first actuator M1. The periodic function PF1 is repeated at a time interval equal to the inverse of the first frequency f1. In other words, if the repetition frequency of the periodic function is adapted, the time interval is changed.

As can also be seen in FIG. 6, the periodic function PF2 also completes a cycle from time 0 to time 1/f1 and provides the force to be exerted by the second actuator M2 depending on elapsed time. The periodic function PF2 is repeated at a time interval equal to the inverse of the first frequency f1. In other words, if the repetition frequency of the periodic function is adapted, the time interval is changed. The periodic function PF2 is phase shifted in relation to the periodic function PF1. In the example of FIG. 6, the periodic function PF2 is delayed or shifted half a periodic cycle in relation to the periodic function PF1.

In one example, a number N of actuators can be used, each associated to a periodic function phase shifted relative to the first periodic function with shifts being distributed equally over the cycle of the periodic function PF1. In other words, when using two actuators the shift is half a cycle. When using three actuators the shift is a third of a cycle. When using three actuators the shift is a quarter of a cycle etc.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the control unit CT may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processing circuitry and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as user interface control, or the like.

Finally, it should be understood that the invention is not limited to the embodiments described above, but also relates to and incorporates all embodiments within the scope of the appended independent claims.

The invention claimed is:

1. A method for a thawing device configured to thaw/heat a blood product comprised in a container, the method comprising the steps of:
   performing a massaging motion, by a first actuator, on one or more areas of an outer surface of the container,
   obtaining measurements, from a reflectance sensor coupled to an antenna the measurements at least being indicative of phase of received radio frequency, RF, waves having a second frequency and being reflected off the container,
   determining a third frequency, wherein the third frequency is determined by a predetermined relation dependent on the second frequency and the obtained measurements,
   controlling a transmitter, communicatively coupled to the antenna, to emit RF waves using the obtained measurements, wherein the emitted RF waves are emitted at the third frequency and are directed by the antenna to propagate towards the container, wherein the third frequency is in the range of 10 to 900 MHz.

2. The method according to claim 1, wherein the predetermined relation is defined as:

$$f3 = f2 + k^*(\varphi_{Ref} - \varphi)$$

wherein f3 is the third frequency, f2 is the second frequency, k is a scale factor, $\varphi_{Ref}$ is a reference phase value and p is the measured phase of the received RF waves.

3. The method according to claim 2, wherein the reference phase value is obtained by initially sweeping said range to obtain a minimum reflection value and measuring the reference phase at the frequency where the minimum reflection value is obtained.

4. The method according to claim 1, wherein the massaging motion is exerting a force to one or more areas of an outer surface of the container.

5. The method according to claim 1, wherein the steps of obtaining, determining and controlling are repeated a number N times, before repeating the step of performing a massaging motion, wherein the number N is selected from the range of [2-1000].

6. A thawing device configured to thaw/heat a blood product comprised in a container, the thawing device comprising:
   a first controllable actuator configured to performing a massaging motion on one or more areas of an outer surface of the container,
   a controllable transmitter configured to generate RF waves and being communicatively coupled to an antenna configured to emit RF waves towards the container,
   a reflectance sensor coupled to the antenna and configured to measure characteristics of radio frequency, RF, waves, the measurements at least being indicative of phase of received radio frequency, RF, waves having a second frequency and being reflected off the container,
   a control unit communicatively coupled to the first actuator and the transmitter, the control unit comprising processing circuitry; and a memory, said memory containing instructions executable by said processing circuitry, whereby said B thawing device is operative/configured to perform method steps according to claim 1.

7. The thawing device according to claim 6, wherein the massaging motion is exerting a force to the container.

8. The thawing device according to claim 6, further comprising a chamber configured to hold the container during thawing/heating thereof.

9. The thawing device according to claim 8, further comprising a mounting member configured to be releasably attached to the chamber.

10. The thawing device according to claim 9, further comprising a cassette member configured to hold the container, wherein the massaging motion is exerting a force to the container via the cassette member.

11. The thawing device according to claim 10, wherein the cassette member is provided with holding members arranged to be in contact with the container and cassette member.

12. The thawing device according to claim 9, wherein the mounting member is provided with receiving arrangements configured to securably and supportably receiving said cassette member in a fixed position relative to the mounting member and relative to the antenna.

13. The method according to claim 1, wherein the steps of obtaining, determining and controlling are repeated a number N times, before repeating the step of performing a massaging motion, wherein the number N is selected from the range of [200-400].

14. The method according to claim 1, wherein the steps of obtaining, determining and controlling are repeated a number N times, before repeating the step of performing a massaging motion, wherein the number N is selected from the range of [250-350].

15. A computer program comprising computer-executable instructions for causing a thawing device, when the computer-executable instructions are executed on processing circuitry comprised in the thawing B device, to perform the method steps according to claim 1.

* * * * *